US012601963B2

(12) United States Patent
Yeh et al.

(10) Patent No.: US 12,601,963 B2
(45) Date of Patent: Apr. 14, 2026

(54) EXTERNAL ELECTRIC ADJUSTING MODULE AND LENS DEVICE

(71) Applicant: Qisda Corporation, Taoyuan City (TW)

(72) Inventors: Hsin-Jung Yeh, Taoyuan City (TW); Chun Ming Shen, Taoyuan City (TW); Sheng-Wen Hu, Taoyuan City (TW); Hsin-Liang Chen, Taoyuan City (TW)

(73) Assignee: Qisda Corporation, Taoyuan City (TW)

( * ) Notice: Subject to any disclaimer, the term of this patent is extended or adjusted under 35 U.S.C. 154(b) by 326 days.

(21) Appl. No.: 18/407,305

(22) Filed: Jan. 8, 2024

(65) Prior Publication Data

US 2024/0272530 A1 Aug. 15, 2024

(30) Foreign Application Priority Data

Feb. 10, 2023 (CN) .......................... 202310095434.3

(51) Int. Cl.
*G03B 21/14* (2006.01)
*G02B 7/04* (2021.01)

(52) U.S. Cl.
CPC ............. *G03B 21/142* (2013.01); *G02B 7/04* (2013.01)

(58) Field of Classification Search
CPC ................................. G03B 21/142; G02B 7/04
See application file for complete search history.

(56) References Cited

U.S. PATENT DOCUMENTS

| | | | | |
|---|---|---|---|---|
| 4,149,775 | A * | 4/1979 | Blake ....................... | G02B 7/08 |
| | | | | 353/101 |
| 12,309,490 | B2 * | 5/2025 | Shingu ..................... | G02B 7/10 |
| 12,429,750 | B2 * | 9/2025 | Shinano ................. | G03B 17/14 |
| 2004/0165280 | A1 * | 8/2004 | Ichino ..................... | G02B 7/04 |
| | | | | 359/696 |
| 2010/0232035 | A1 * | 9/2010 | Takamatsu ............... | G02B 7/08 |
| | | | | 74/460 |
| 2011/0134549 | A1 * | 6/2011 | Hase ........................ | G02B 7/04 |
| | | | | 359/824 |
| 2011/0317292 | A1 * | 12/2011 | Kuwano .................. | G02B 7/08 |
| | | | | 310/317 |

(Continued)

FOREIGN PATENT DOCUMENTS

| | | |
|---|---|---|
| CN | 205071152 | 3/2016 |
| TW | 321295 | 11/1997 |

*Primary Examiner* — Bao-Luan Q Le

(57) ABSTRACT

An external electric adjusting module adapted for being externally connected to a lens includes a bracket including a first positioning portion, a gear set, a driving assembly driving the gear set to operate, and a variable resistance rotating member. The gear set is rotatably disposed on the bracket, is adapted for being externally connected to the lens, and includes a second positioning portion, a rotating shaft, and a first driving portion located on the rotating shaft. The variable resistance rotating member is sleeved on the rotating shaft, is electrically connected to the driving assembly, and includes a second driving portion corresponding to the first driving portion to be linked with the rotating shaft. When the gear set is located at an initial position together with the lens, the first and second positioning portions are aligned with each other, and the second driving portion abuts against the first driving portion.

20 Claims, 8 Drawing Sheets

(56)         References Cited

U.S. PATENT DOCUMENTS

| | | | |
|---|---|---|---|
| 2016/0299413 A1* | 10/2016 | Fee | G03B 17/56 |
| 2017/0003576 A1* | 1/2017 | Hatakeyama | G03B 17/14 |
| 2017/0235212 A1* | 8/2017 | Hatakeyama | G03B 17/561 |
| | | | 348/335 |
| 2017/0293210 A1* | 10/2017 | Shimizu | G03B 21/142 |
| 2017/0363940 A1* | 12/2017 | Kayano | H04N 9/3141 |
| 2018/0292730 A1* | 10/2018 | Ciabattoni | G02B 27/0006 |
| 2019/0101811 A1* | 4/2019 | Tamura | G03B 21/147 |
| 2019/0215456 A1* | 7/2019 | Fukai | G02B 7/04 |
| 2020/0249417 A1* | 8/2020 | Hatakeyama | G02B 7/08 |
| 2020/0275013 A1* | 8/2020 | Yuan | G02B 7/04 |
| 2021/0255528 A1* | 8/2021 | Kamigaki | G03B 21/145 |
| 2024/0045314 A1* | 2/2024 | Kuo | G03B 21/53 |
| 2024/0345358 A1* | 10/2024 | Konishi | G02B 7/04 |

* cited by examiner

127(120)

128(120)

110

20

30

121(120)

130

100

EXTERNAL ELECTRIC ADJUSTING MODULE AND LENS DEVICE

CROSS-REFERENCE TO RELATED APPLICATION

This application claims the priority benefit of China application serial no. 202310095434.3, filed on Feb. 10, 2023. The entirety of the above-mentioned patent application is hereby incorporated by reference herein and made a part of this specification.

BACKGROUND

Technical Field

The disclosure relates to an adjusting module and a lens device, and in particular, relates to an external electric adjusting module and a lens device.

Description of Related Art

At present, the lens of a projector is mainly adjusted to zoom in, zoom out, or focus in a manual manner. As such, how to achieve electric adjustment under the currently-available lens structure and to prevent collision caused by excessive rotation of the lens from occurring is an important issue.

SUMMARY

The disclosure provides an external electric adjusting module externally connected to a lens to drive the lens to rotate and capable of preventing collision caused by excessive rotation of the lens from occurring.

The invention further provides a lens device including the external electric adjusting module.

The disclosure provides an external electric adjusting module adapted for being externally connected to a lens, and the external electric adjusting module includes a bracket, a gear set, a driving assembly, and a variable resistance rotating member. The bracket includes a first positioning portion. The gear set is rotatably disposed on the bracket and is adapted for being externally connected to the lens. The gear set includes a second positioning portion, a rotating shaft, and a first driving portion located on the rotating shaft. The driving assembly drives the gear set to operate. The variable resistance rotating member is sleeved on the rotating shaft and is electrically connected to the driving assembly. The variable resistance rotating member includes a second driving portion corresponding to the first driving portion to be linked with the rotating shaft. When the gear set is located at an initial position together with the lens, the first positioning portion and the second positioning portion are aligned with each other, and the second driving portion abuts against the first driving portion.

The invention further provides a lens device including a lens and an external electric adjusting module. The external electric adjusting module is detachably and externally connected to the lens, and the external electric adjusting module includes a bracket, a gear set, a driving assembly, and a variable resistance rotating member. The bracket includes a first positioning portion. The gear set is rotatably disposed on the bracket and is adapted for being externally connected to the lens. The gear set includes a second positioning portion, a rotating shaft, and a first driving portion located on the rotating shaft. The driving assembly drives the gear set to operate. The variable resistance rotating member is sleeved on the rotating shaft and is electrically connected to the driving assembly. The variable resistance rotating member includes a second driving portion corresponding to the first driving portion to be linked with the rotating shaft. When the gear set is located at an initial position together with the lens, the first positioning portion and the second positioning portion are aligned with each other, and the second driving portion abuts against the first driving portion.

In an embodiment of the disclosure, the driving assembly drives the gear set when being actuated. The first positioning portion and the second positioning portion are staggered. The variable resistance rotating member is driven by the gear set to rotate.

In an embodiment of the disclosure, the external electric adjusting module further includes a controller electrically connected to the driving assembly and the variable resistance rotating member. The controller controls the driving assembly according to rotation angle information of the variable resistance rotating member, so that a rotation angle of the lens is limited within a range.

In an embodiment of the disclosure, the gear set includes a first gear and a rack meshed with each other. The rotating shaft is located on the first gear, and the rack is adapted for being fixed to the lens.

In an embodiment of the disclosure, the gear set includes a second gear meshed with the first gear and the driving assembly is linked with the second gear.

In an embodiment of the disclosure, a radius of the second gear is smaller than a radius of the first gear. The rack is in an arc shape, and a radius of the arc is greater than the radius of the first gear.

In an embodiment of the disclosure, the bracket further includes a stopper. The rack is located between the stopper and the first gear, and the rack abuts against the stopper.

In an embodiment of the disclosure, the external electric adjusting module further includes a circuit board and a variable resistance fixing member disposed on the circuit board. The variable resistance rotating member is rotatably disposed on the variable resistance fixing member.

In an embodiment of the disclosure, the first positioning portion and the second positioning portion are two holes adapted for a positioning pin to be inserted into for positioning in the initial position.

In an embodiment of the disclosure, the rotating shaft includes a first arc surface and a first chord surface. The first driving portion is the first chord surface. The second driving portion abuts against the first chord surface to be driven by the first driving portion. The second driving portion includes a second arc surface and a second chord surface, and the second chord surface abuts against the first chord surface.

To sum up, in the disclosure, the driving assembly of the external electric adjusting module drives the gear set, and the gear set is externally connected to the lens. Therefore, in the disclosure, through the use of the external electric adjusting module, the lens can be electrically adjusted (for example, zoom in, zoom out, or focus). In addition, in the disclosure, the gear set of the external electric adjusting module is rotatably disposed on the bracket. When the gear set is located at the initial position together with the lens, the first positioning portion of the bracket and the second positioning portion of the gear set are aligned with each other and can be used as the starting point for rotation. The second driving portion of the variable resistance rotating member abuts against the first driving portion of the gear set, so that the variable resistance rotating member may be driven by the gear set during subsequent rotation. In the disclosure, the external electric adjusting module may obtain the rotation angle information through the variable resistance rotating member. The variable resistance rotating member is electrically connected to the driving assembly, so that the driving assembly stops operating based on the rotation angle information of the variable resistance rotating member, and that the end point for rotation of the lens is controlled. Therefore, the rotation angle of the lens is limited within the predetermined range, so that collision caused by the rotation angle of the lens exceeding the predetermined range is prevented from occurring.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
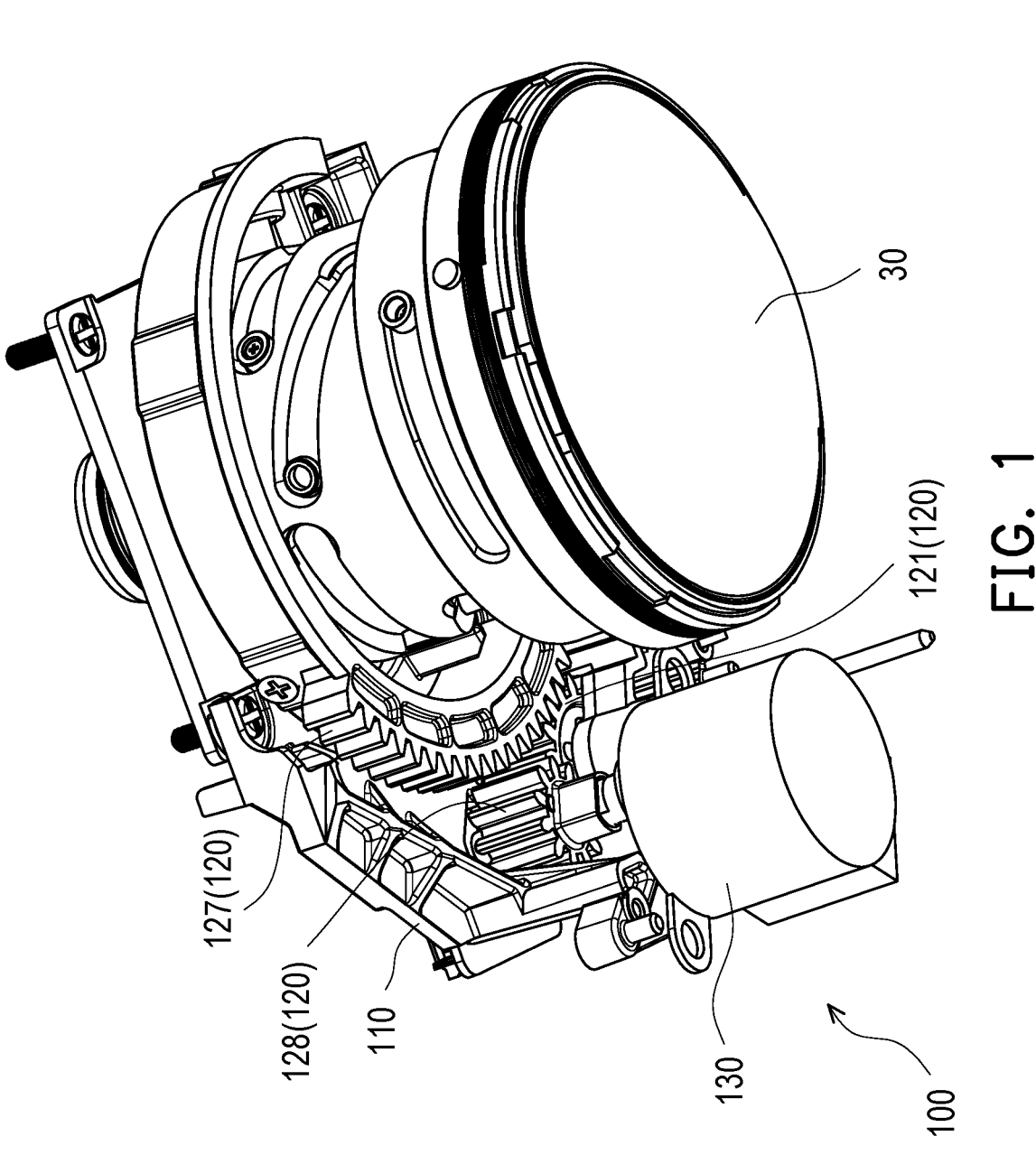
FIG. 1 is a schematic view of a lens device according to an embodiment of the disclosure.
Figure 2:
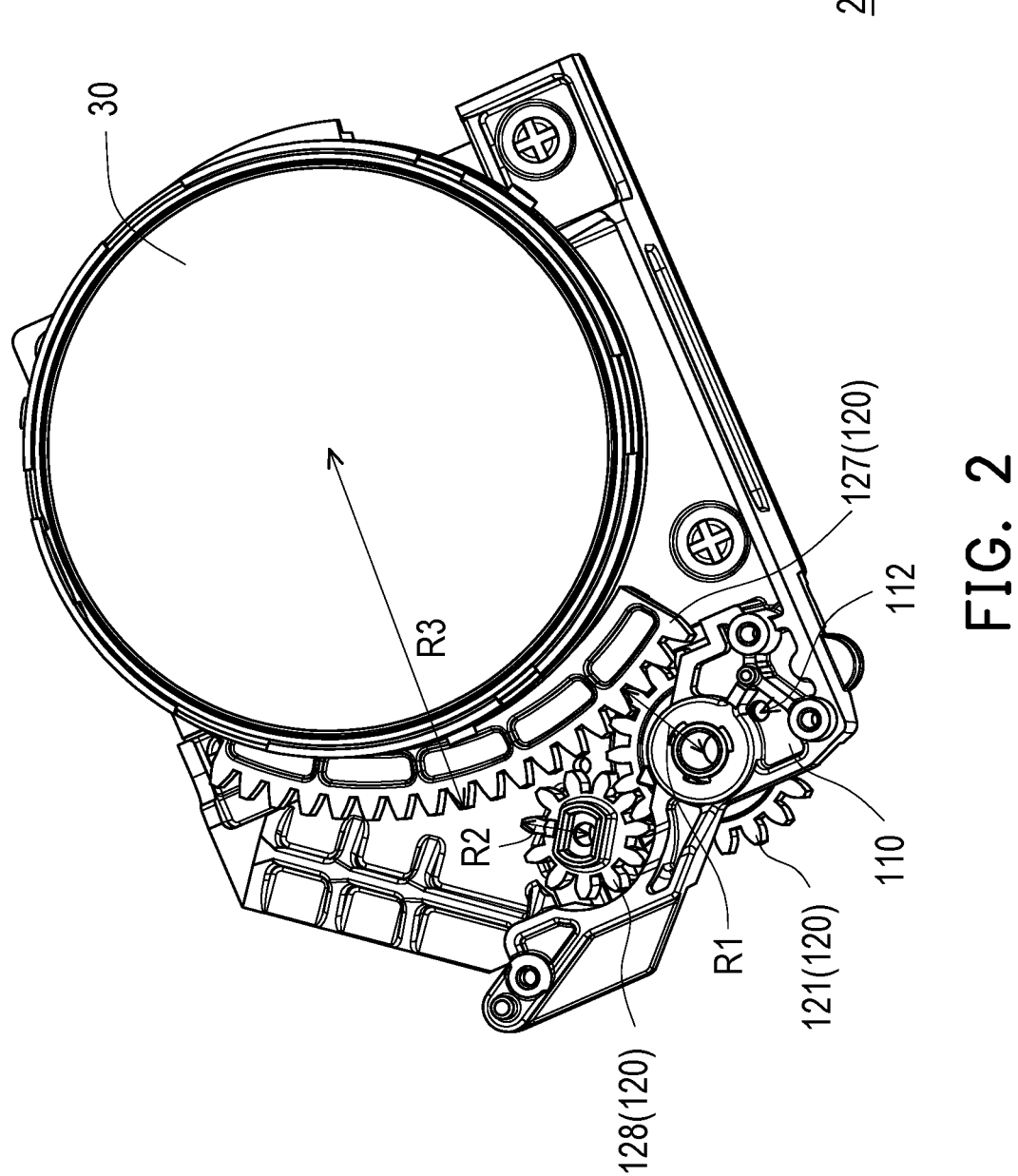
FIG. 2 is a schematic view of FIG. 1 with a driving assembly being hidden.
Figure 3:
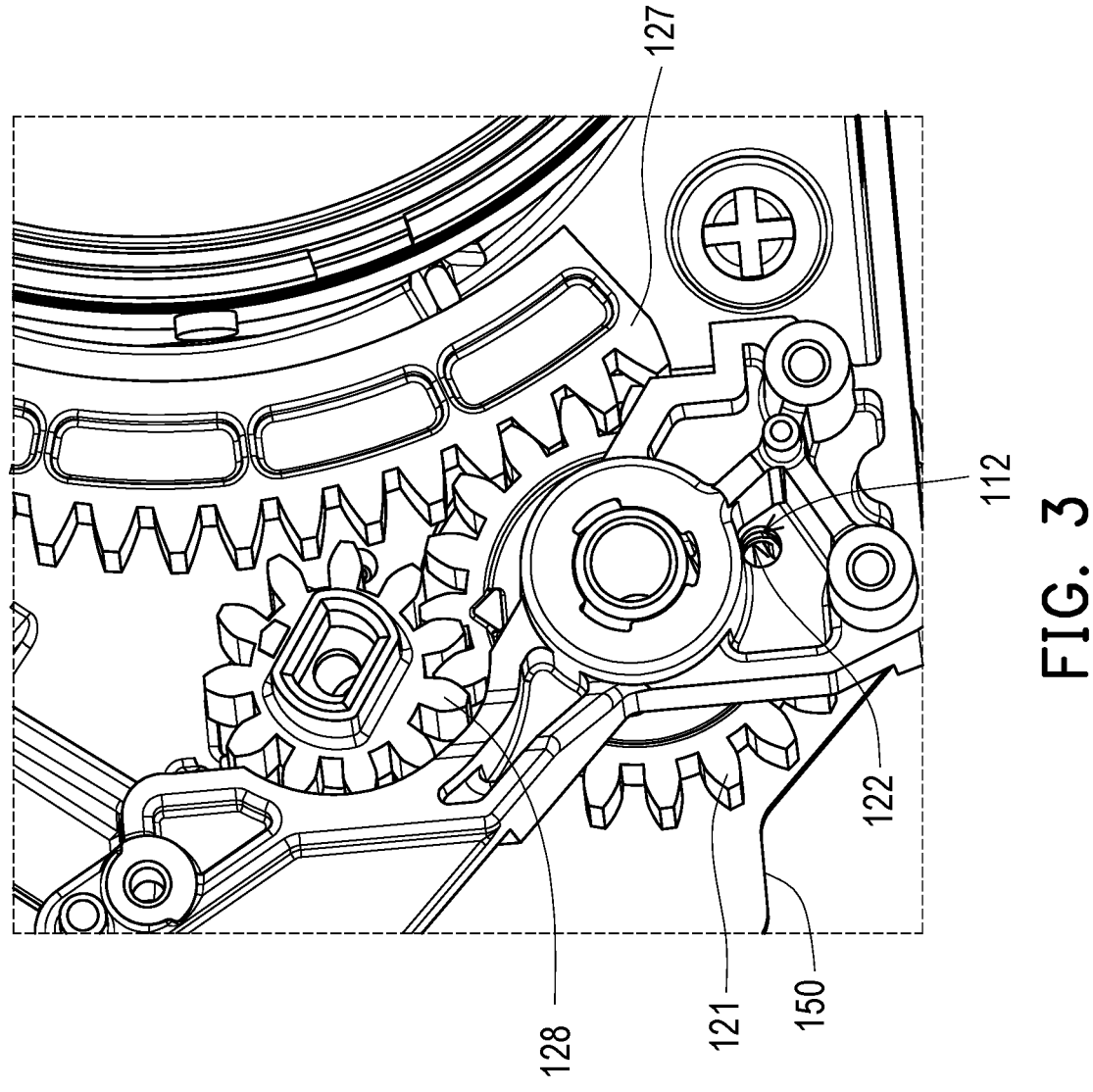
FIG. 3 is a schematic view of a gear set of FIG. 2.

FIG. 1 is a schematic view of a lens device according to an embodiment of the disclosure. FIG. 2 is a schematic view of FIG. 1 with a driving assembly being hidden. FIG. 3 is a schematic view of a gear set of FIG. 2. With reference to FIG. 1 to FIG. 3, in this embodiment, a lens device 20 includes a lens 30 and an external electric adjusting module 100. The external electric adjusting module 100 is detachably and externally connected to the lens 30 to adjust zoom or focus of the lens 30.

Figure 4:
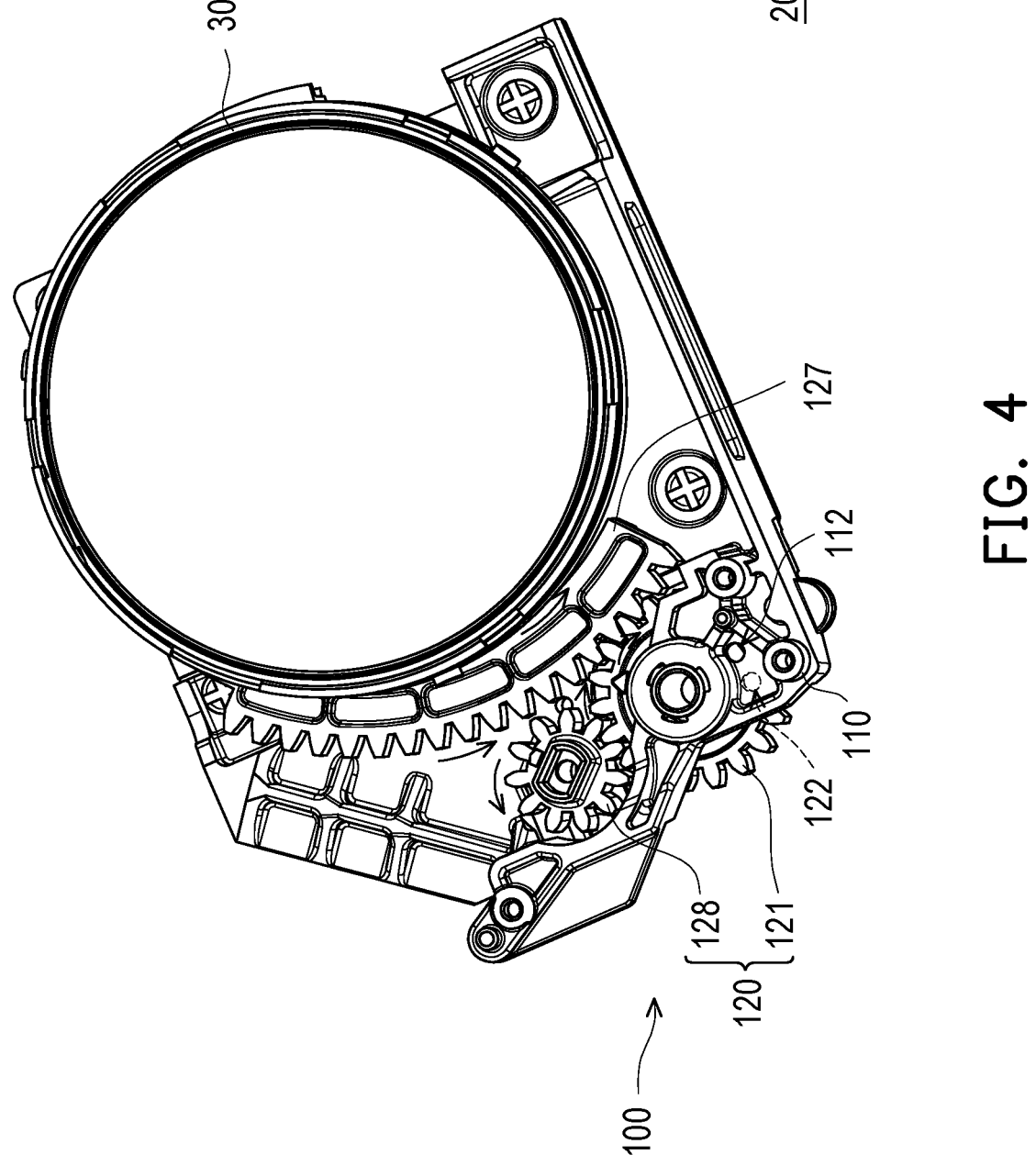
FIG. 4 is a schematic view of the gear set in FIG. 2 leaving an initial position together with a lens.
Figure 5:
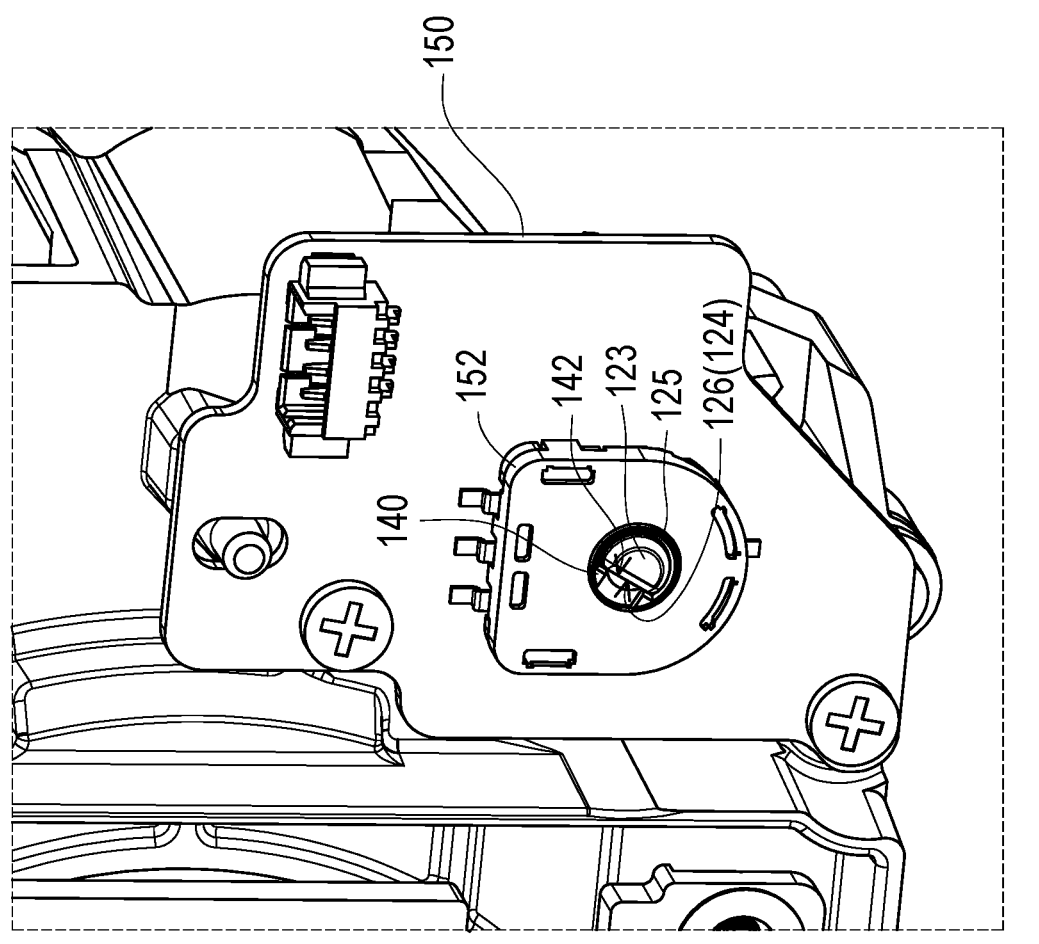
FIG. 5 is a schematic view of a back side of FIG. 3.

The external electric adjusting module 100 includes a bracket 110, a gear set 120, a driving assembly 130, and a variable resistance rotating member 140 (FIG. 4 and FIG. 5). As shown in FIG. 2 and FIG. 3, the bracket 110 includes a first positioning portion 112. In this embodiment, the first positioning portion 112 is a hole.

As shown in FIG. 2, the gear set 120 is rotatably disposed on the bracket 110 and externally connected to the lens 30, and the driving assembly 130 drives the gear set 120 to operate. To be specific, the gear set 120 includes a first gear 121, a rack 127 meshed with the first gear 121, and a second gear 128 meshed with the first gear 121. The driving assembly 130 (FIG. 1) is linked with the second gear 128. The drive assembly 130 is but not limited to a motor, for example. The rack 127 is fixed to the lens 30, and the lens 30 moves together with the rack 127. Therefore, when the driving assembly 130 operates, the driving assembly 130 can drive the second gear 128 to rotate, the second gear 128 drives the first gear 121, and the first gear 121 drives the rack 127 to rotate the lens 30.

As shown in FIG. 2, in the present embodiment, a radius R of the first gear 121 is greater than a radius R2 of the second gear 128. The rack 127 is arc-shaped, and a radius R3 of the arc-shaped rack 127 is greater than the radius R1 of the first gear 121. The gear set 120 achieves the effect of reducing a rotation speed and a rotation angle through the abovementioned dimensional relationship. That is, regarding the rotation speed and the rotation angle provided by the driving assembly 130 (FIG. 1), since the gear set 120 can decelerate and reduce the rotation angle, the lens 30 can rotate slowly and the rotation angle is small, and the angle of the lens 30 may thus be adjusted more precisely.

It is worth mentioning that when the electric adjustment is performed, attention is required to be paid to the rotation angle of the lens 30, so that collision caused by the rotation angle of the lens 30 exceeding a predetermined range is prevented from occurring. In this embodiment, in the external electric adjusting module 100, the following design is used to ensure that the rotation angle of the lens 30 is within the predetermined range.

As shown in FIG. 3, the gear set 120 includes a second positioning portion 122 located on the first gear 121, and in this embodiment, the second positioning portion 122 is a hole as well. FIG. 3 is a schematic view of the gear set 120 located at an initial position. In FIG. 3, it can be seen that the second positioning portion 122 of the first gear 121 is aligned with the first positioning portion 112 of the bracket 110.

During the installation process, a positioning pin (not shown, referring to a rod that can be inserted into the two holes) may be inserted into the first positioning portion 112 of the bracket 110 and the second positioning portion 122 of the first gear 121 at this position, so that the first gear 121 may not rotate relative to the bracket 110 temporarily. Other components are assembled next. That is, when the gear set 120 is located at the initial position together with the lens 30, the second positioning portion 122 of the first gear 121 is aligned with the first positioning portion 112 of the bracket 110, and this position may be used as a starting point for rotation.

After the assembly of the external electric adjusting module 100 is completed, the positioning pin is pulled out from the first positioning portion 112 of the bracket 110 and the second positioning portion 122 of the first gear 121, and the first gear 121 can rotate relative to the bracket 110. FIG. 4 is a schematic view of the gear set in FIG. 2 leaving an initial position together with a lens. With reference to FIG. 4, when the driving assembly 130 (FIG. 1) is actuated, the gear set 120 is driven to rotate as shown by the arrow in FIG. 4, and the lens 30 rotates relative to the bracket 110. At this time, the first positioning portion 112 and the second positioning portion 122 are staggered.

FIG. 5 is a schematic view of a back side of FIG. 3. With reference to FIG. 5, the external electric adjusting module 100 further includes a circuit board 150 and a variable resistance fixing member 152 disposed on the circuit board 150. The circuit board 150 is located behind the first gear 121.

Figure 6:
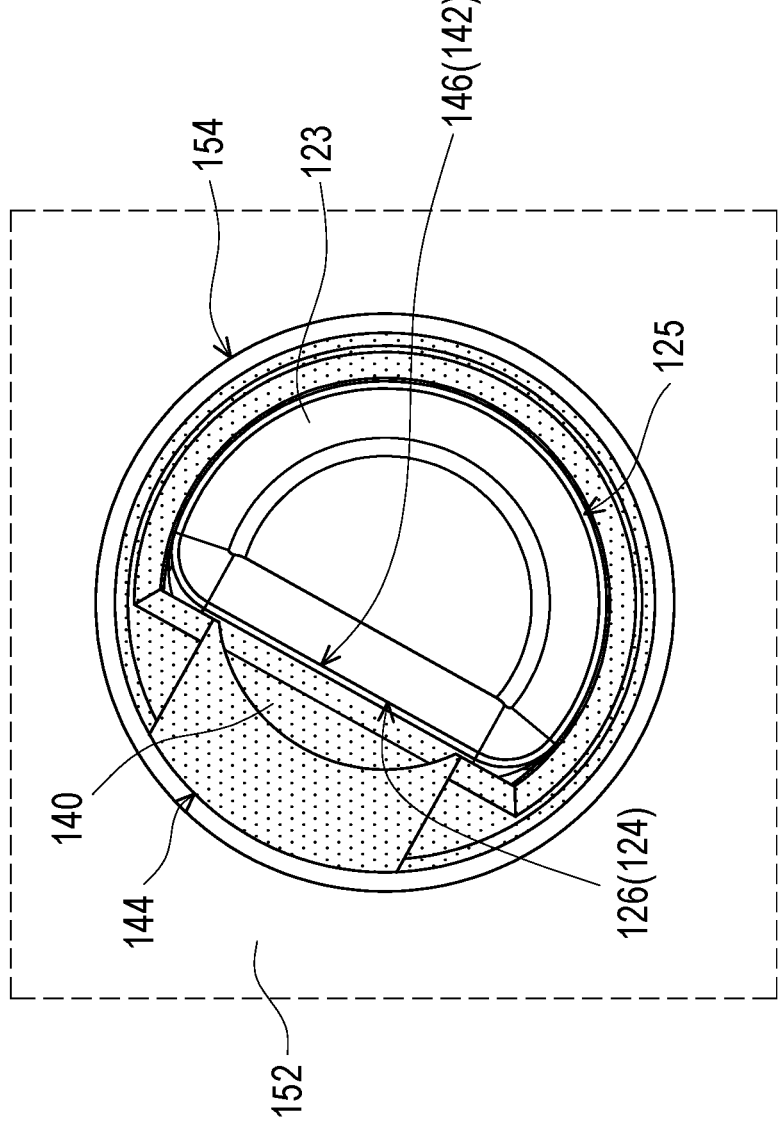
FIG. 6 is a schematic local enlargement view of a variable resistance rotating member and a rotating shaft of FIG. 5.

FIG. 6 is a schematic local enlargement view of a variable resistance rotating member and a rotating shaft of FIG. 5. With reference to FIG. 6, the variable resistance fixing member 152 has a through hole 154, and the variable resistance rotating member 140 is rotatably disposed in the through hole 154 of the variable resistance fixing member 152. When the variable resistance rotating member 140 rotates relative to the variable resistance fixing member 152, a change in resistance may be generated. The variable resistance rotating member 140 is driven through the gear set 120.

To be specific, the gear set 120 includes a rotating shaft 123 (FIG. 5 and FIG. 6) coaxial and linked with the first gear 121 (FIG. 3) and a first driving portion 124 (FIG. 5 and FIG. 6) located on the rotating shaft 123. The rotating shaft 123 coaxial with the first gear 121 and linked with the first gear 121 passes through the circuit board 150 and the through hole 154 of the variable resistance fixing member 152, and the variable resistance rotating member 140 is sleeved on the rotating shaft 123. In this embodiment, the rotating shaft 123 is a cylinder with a flat cut, the rotating shaft 123 includes a first arc surface 125 and a first chord surface 126, and the first driving portion 124 is the first chord surface 126.

As shown in FIG. 6, the variable resistance rotating member 140 includes a second driving portion 142 corresponding to the first driving portion 124. In this embodiment, the second driving portion 142 includes a second arc surface 144 and a second chord surface 146. The second driving portion 142 is the second chord surface 146. The second chord surface 146 abuts against the first chord surface 126, so that the second driving portion 142 is driven by the first driving portion 124 to be linked with the rotating shaft 123.

That is, when the first gear 121 rotates, the rotating shaft 123 rotates accordingly, and the rotating shaft 123 drives the variable resistance rotating member 140 to rotate relative to the variable resistance fixing member 152 to generate a resistance change. Therefore, rotation angle information of the rotating shaft 123 may be obtained, and the corresponding rotation angle of the lens 30 may be obtained by converting a reduced rotational magnification of the gear set 120.

Figure 7:
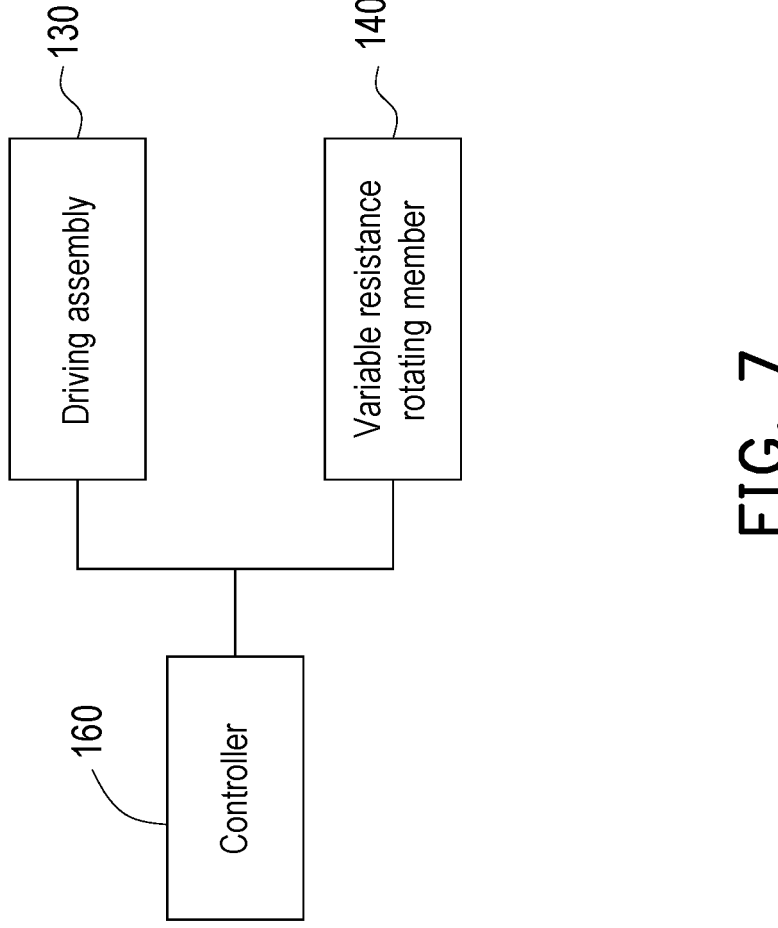
FIG. 7 is a diagram of an electrical connection relationship among a controller, the driving assembly, and the variable resistance rotating member.

FIG. 7 is a diagram of an electrical connection relationship among a controller, the driving assembly, and the variable resistance rotating member. With reference to FIG. 7, in this embodiment, the external electric adjusting module 100 further includes a controller 160 electrically connected to the driving assembly 130 and the variable resistance rotating member 140. The controller 160 controls whether the driving assembly 130 continues to rotate according to the rotation angle information of the variable resistance rotating member 140 to control an end point for rotation of the lens 30. Therefore, the rotation angle of the lens 30 may be limited within the predetermined range, so that collision caused by the rotation angle of the lens 30 exceeding the predetermined range is prevented from occurring.

Figure 8:
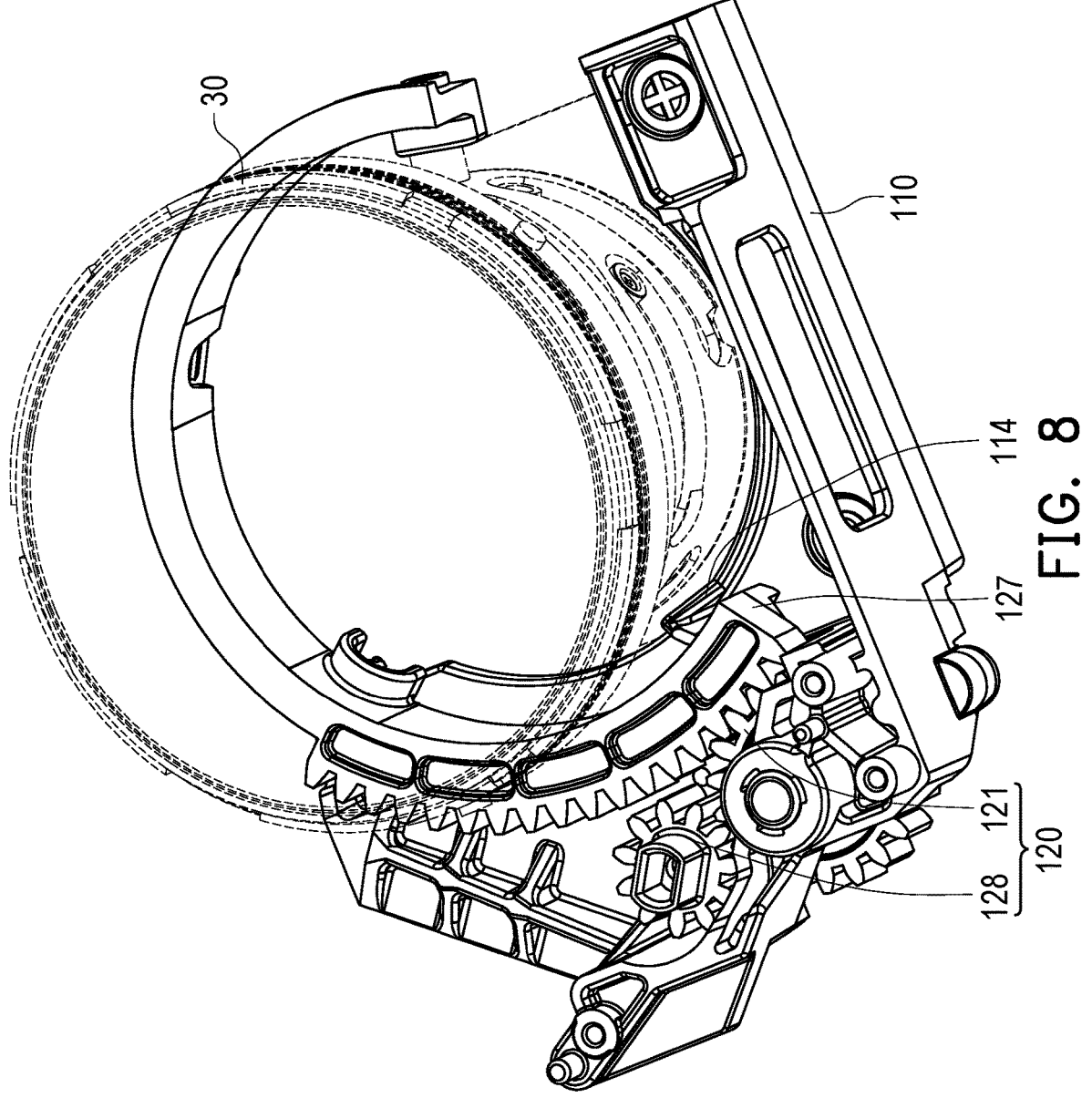
FIG. 8 is a schematic perspective view of the lens of FIG. 1.

FIG. 8 is a schematic perspective view of the lens of FIG. 1. With reference to FIG. 8, in this embodiment, the bracket 110 further includes a stopper 114, and the stopper 114 is located beside the rack 127 and abuts against an arc edge of the rack 127. The rack 127 is located between the first gear 121 and the stopper 114. The stopper 114 may prevent the rack 127 from moving away from the first gear 121, so that the rack 127 is prevented from being disengaged from the first gear 121, and the lens 30 is prevented from colliding with the bracket 110 due to unintended movement during rotation. In addition, the arc-shaped edge of the rack 127 may rotate along the stopper 114 when the rack 127 is rotating. Therefore, the stopper 114 may also be used to guide the moving direction of the rack 127.

In view of the foregoing, in the disclosure, the driving assembly of the external electric adjusting module drives the gear set, and the gear set is externally connected to the lens.

Therefore, in the disclosure, through the use of the external electric adjusting module, the lens can be electrically adjusted (for example, zoom in, zoom out, or focus). In addition, in the disclosure, the gear set of the external electric adjusting module can be rotatably disposed on the bracket. When the gear set is located at the initial position together with the lens, the first positioning portion of the bracket and the second positioning portion of the gear set are aligned with each other and can be used as the starting point for rotation. The second driving portion of the variable resistance rotating member abuts against the first driving portion of the gear set, so that the variable resistance rotating member may be driven by the gear set during subsequent rotation. In the disclosure, the external electric adjusting module may obtain the rotation angle information through the variable resistance rotating member. The variable resistance rotating member is electrically connected to the driving assembly, so that the driving assembly stops operating based on the rotation angle information of the variable resistance rotating member, and that the end point for rotation of the lens is controlled. Therefore, the rotation angle of the lens may be limited within the predetermined range, so that collision caused by the rotation angle of the lens exceeding the predetermined range is prevented from occurring.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An external electric adjusting module adapted for being externally connected to a lens, wherein the external electric adjusting module comprises:
   a bracket comprising a first positioning portion;
   a gear set rotatably disposed on the bracket and adapted for being externally connected to the lens, wherein the gear set comprises a second positioning portion, a rotating shaft, and a first driving portion located on the rotating shaft;
   a driving assembly driving the gear set to operate; and
   a variable resistance rotating member sleeved on the rotating shaft and electrically connected to the driving assembly, wherein the variable resistance rotating member comprises a second driving portion corresponding to the first driving portion to be linked with the rotating shaft, wherein
   when the gear set is located at an initial position together with the lens, the first positioning portion and the second positioning portion are aligned with each other, and the second driving portion abuts against the first driving portion.

2. The external electric adjusting module according to claim 1, wherein the driving assembly drives the gear set when being actuated, the first positioning portion and the second positioning portion are staggered, and the variable resistance rotating member is driven by the gear set to rotate.

3. The external electric adjusting module according to claim 1, further comprising a controller electrically connected to the driving assembly and the variable resistance rotating member, and the controller controls the driving assembly according to rotation angle information of the variable resistance rotating member, so that a rotation angle of the lens is limited within a range.

4. The external electric adjusting module according to claim 1, wherein the gear set comprises a first gear and a rack meshed with each other, the rotating shaft is located on the first gear, and the rack is adapted for being fixed to the lens.

5. The external electric adjusting module according to claim 4, wherein the gear set comprises a second gear meshed with the first gear, and the driving assembly is linked with the second gear.

6. The external electric adjusting module according to claim 5, wherein a radius of the second gear is smaller than a radius of the first gear, the rack is in an arc shape, and a radius of the arc is greater than the radius of the first gear.

7. The external electric adjusting module according to claim 4, wherein the bracket further comprises a stopper, the rack is located between the stopper and the first gear, and the rack abuts against the stopper.

8. The external electric adjusting module according to claim 1, further comprising a circuit board and a variable resistance fixing member disposed on the circuit board, wherein the variable resistance rotating member is rotatably disposed on the variable resistance fixing member.

9. The external electric adjusting module according to claim 1, wherein the first positioning portion and the second positioning portion are two holes adapted for a positioning pin to be inserted into for positioning in the initial position.

10. The external electric adjusting module according to claim 1, wherein the rotating shaft comprises a first arc surface and a first chord surface, the first driving portion is the first chord surface, the second driving portion abuts against the first chord surface to be driven by the first driving portion, the second driving portion comprises a second arc surface and a second chord surface, and the second chord surface abuts against the first chord surface.

11. A lens device, comprising:
a lens; and
an external electric adjusting module detachably and externally connected to the lens, wherein the external electric adjusting module comprises:
a bracket comprising a first positioning portion;
a gear set rotatably disposed on the bracket and adapted for being externally connected to the lens, wherein the gear set comprises a second positioning portion, a rotating shaft, and a first driving portion located on the rotating shaft;
a driving assembly driving the gear set to operate; and
a variable resistance rotating member sleeved on the rotating shaft and electrically connected to the driving assembly, wherein the variable resistance rotating member comprises a second driving portion corresponding to the first driving portion to be linked with the rotating shaft, wherein when the gear set is located at an initial position together with the lens, the first positioning portion and the second positioning portion are aligned with each other, and the second driving portion abuts against the first driving portion.

12. The lens device according to claim 11, wherein the driving assembly drives the gear set when being actuated, the first positioning portion and the second positioning portion are staggered, and the variable resistance rotating member is driven by the gear set to rotate.

13. The lens device according to claim 11, wherein the external electric adjusting module further comprises a controller electrically connected to the driving assembly and the variable resistance rotating member, and the controller controls the driving assembly according to rotation angle information of the variable resistance rotating member, so that a rotation angle of the lens is limited within a range.

14. The lens device according to claim 11, wherein the gear set comprises a first gear and a rack meshed with each other, the rotating shaft is located on the first gear, and the rack is adapted for being fixed to the lens.

15. The lens device according to claim 14, wherein the gear set comprises a second gear meshed with the first gear, and the driving assembly is linked with the second gear.

16. The lens device according to claim 15, wherein a radius of the second gear is smaller than a radius of the first gear, the rack is in an arc shape, and a radius of the arc is greater than the radius of the first gear.

17. The lens device according to claim 14, wherein the bracket further comprises a stopper, the rack is located between the stopper and the first gear, and the rack abuts against the stopper.

18. The lens device according to claim 11, wherein the external electric adjusting module further comprises a circuit board and a variable resistance fixing member disposed on the circuit board, wherein the variable resistance rotating member is rotatably disposed on the variable resistance fixing member.

19. The lens device according to claim 11, wherein the first positioning portion and the second positioning portion are two holes adapted for a positioning pin to be inserted into for positioning in the initial position.

20. The lens device according to claim 11, wherein the rotating shaft comprises a first arc surface and a first chord surface, the first driving portion is the first chord surface, the second driving portion abuts against the first chord surface to be driven by the first driving portion, the second driving portion comprises a second arc surface and a second chord surface, and the second chord surface abuts against the first chord surface.

* * * * *